(12) United States Patent
Kunimoto et al.

(10) Patent No.: US 11,401,888 B2
(45) Date of Patent: Aug. 2, 2022

(54) STEAM TURBINE AND CONSTRUCTION METHOD OF STEAM TURBINE

(71) Applicants: MITSUBISHI HEAVY INDUSTRIES COMPRESSOR CORPORATION, Tokyo (JP); Sanyu Industries Co., Ltd., Aichi (JP)

(72) Inventors: Akito Kunimoto, Hiroshima (JP); Keita Mori, Komaki (JP)

(73) Assignees: MITSUBISHI HEAVY INDUSTRIES COMPRESSOR CORPORATION, Tokyo (JP); SANYU INDUSTRIES CO., LTD., Aichi (JP)

( * ) Notice: Subject to any disclaimer, the term of this patent is extended or adjusted under 35 U.S.C. 154(b) by 396 days.

(21) Appl. No.: 16/743,537

(22) Filed: Jan. 15, 2020

(65) Prior Publication Data

US 2020/0232417 A1 Jul. 23, 2020

(30) Foreign Application Priority Data

Jan. 17, 2019 (JP) .............................. JP2019-006187

(51) Int. Cl.
| | |
|---|---|
| *F02K 1/82* | (2006.01) |
| *F01K 13/00* | (2006.01) |
| *F01D 25/24* | (2006.01) |
| *G10K 11/175* | (2006.01) |

(Continued)

(52) U.S. Cl.
CPC .............. *F02K 1/827* (2013.01); *F01D 25/24* (2013.01); *F01K 3/002* (2013.01); *F01K 13/006* (2013.01); *G10K 11/175* (2013.01); *F01D 25/145* (2013.01); *F05D 2260/962* (2013.01)

(58) Field of Classification Search
CPC .... G10K 11/175; G10K 11/172; F02K 1/827; F01D 25/24; F01D 25/26; F01D 25/145; F01K 3/002; F01K 13/006; F05D 2220/31; F05D 2260/96; F05D 2260/962; F05D 2260/963
See application file for complete search history.

(56) References Cited

U.S. PATENT DOCUMENTS 6,151,882 A * 11/2000 Cavanagh ............... F02K 3/025
60/262
10,428,732 B2 * 10/2019 Lynn ....................... F23R 3/007
(Continued)

FOREIGN PATENT DOCUMENTS

JP 2001-221011 A 8/2001

*Primary Examiner* — Igor Kershteyn
(74) *Attorney, Agent, or Firm* — Osha Bergman Watanabe & Burton LLP

(57) ABSTRACT

A steam turbine 1 includes a turbine body 11 which includes a rotor 5 which is configured to rotate around an axis Ac, and a casing 6 which covers the rotor 5 to form a flow path through which steam flows in an axis Ac direction, together with the rotor 5, a thermal insulation member 12 which is provided to be in contact with an outer surface of the casing 6 in a high-pressure side region 61 out of the high-pressure side region 61 and a low-pressure side region 62 of the steam in the axis Ac direction of the casing 6, and a soundproof cover 13 which covers the low-pressure side region 62 out of the high-pressure side region 61 and the low-pressure side region 62 via a space between the outer surface of the casing 6 and the soundproof cover 13.

11 Claims, 4 Drawing Sheets

(51) Int. Cl.
  *F01K 3/00*  (2006.01)
  *F01D 25/14*  (2006.01)

(56) References Cited

U.S. PATENT DOCUMENTS

| | | | | |
|---|---|---|---|---|
| 2005/0198967 A1* | 9/2005 | Subramanian | ........ | C23C 24/04 |
| | | | | 60/803 |
| 2009/0241549 A1* | 10/2009 | Clay | ........................ | F02C 7/08 |
| | | | | 60/262 |
| 2010/0288429 A1* | 11/2010 | Matron | .................. | F01D 25/24 |
| | | | | 156/243 |

* cited by examiner

STEAM TURBINE AND CONSTRUCTION METHOD OF STEAM TURBINE

BACKGROUND OF THE INVENTION

Field of the Invention

The present disclosure relates to a steam turbine and a construction method of a steam turbine.

Priority is claimed on Japanese Patent Application No. 2019-006187, filed on Jan. 17, 2019, the content of which is incorporated herein by reference.

Description of Related Art

In general, a steam turbine includes a rotor which is configured to rotate around an axis, and a casing which covers the rotor from an outside to form a steam flow path between the rotor and the casing. The rotor has a columnar rotating shaft which extends along the axis and a plurality of rotor blades which are arranged on an outer peripheral surface of the rotating shaft. A plurality of stationary blades (nozzles) which are arranged so as to alternate with the rotor blades in an axial direction are provided on an inner peripheral surface of the casing. When high-temperature and high-pressure steam flows through the steam flow path, the steam collides with the rotor blades and the stationary blades. The steam colliding with the rotor blades provides a rotational force to the rotor, and the steam colliding with the stationary blade is guided and rectified toward the rotor blade on a downstream side.

During an operation of the steam turbine, a noise is generated mainly due to a wind noise or the like when the steam flows through the rotor blades (stationary blades). In order to reduce the noise, a thermal insulation member which keeps the steam turbine warm may be used. For example, in Japanese Unexamined Patent Application, First Publication No. 2001-221011, a heat insulating layer in which a plurality of different materials are provided in layers is provided on an outer surface of the casing without a gap. By using the structure, the noise of the steam turbine is limited to some extent.

SUMMARY OF THE INVENTION

Here, in a steam turbine, an upstream region into which steam flows has a higher pressure, and a downstream region from which the steam is discharged has a lower pressure. Therefore, in general, a plate thickness of a material constituting the casing is set to be thick in a high-pressure side casing, and the plate thickness is set to be thin in a low-pressure side casing. Therefore, a noise easily propagates to the outside through the casing on the low-pressure side. Moreover, a rotor blade or a stationary blade on the low-pressure side is longer than the rotor blade or the stationary blade on the high-pressure side. Accordingly, a wind noise due to the blade on the low-pressure side tends to increase. Due to these factors, a larger noise easily occurs on the low-pressure side compared to the high-pressure side. Therefore, there is an increasing demand for a technology which can positively reduce the noise on the low-pressure side.

However, in the technology described in Japanese Unexamined Patent Application, First Publication No. 2001-221011, the casing is covered with the heat insulating layer having a uniform thickness, regardless of the high-pressure side or low-pressure side of the steam turbine. Accordingly, the noise may not be sufficiently blocked on the low-pressure side.

In addition to the structure of Japanese Unexamined Patent Application, First Publication No. 2001-221011, in order to more reliably reduce the noise, a structure is known, in which a room referred to as an outer garment is formed and the entire steam turbine is accommodated in the room. In this outer garment, it is necessary to secure a space for a worker to enter the outer garment in consideration of maintenance of the steam turbine. Therefore, it is necessary to secure a large space around the steam turbine. Accordingly, in a case where the entire steam turbine is covered with the outer garment, the size of the entire apparatus is large.

The present disclosure provides a steam turbine which is more compact and can further reduce a noise and a construction method of the steam turbine.

According to a first aspect of the present disclosure, there is provided a steam turbine including: a turbine body which includes a rotor which is configured to rotate around an axis, and a casing which covers the rotor to form a flow path through which steam flows in an axial direction in which the axis extends, together with the rotor; a thermal insulation member which is provided to be in contact with an outer surface of the casing in a high-pressure side region out of the high-pressure side region and a low-pressure side region in which pressure of the steam is different from each other of the casing in the axial direction; and a soundproof cover which covers the casing in the low-pressure side region out of the high-pressure side region and the low-pressure side region via a space between the outer surface of the casing and the soundproof cover.

According to the above configuration, the low-pressure side region in the casing is covered with the soundproof cover via the space. Therefore, a noise generated in the low-pressure side region can be absorbed and attenuated by the soundproof cover while being attenuated by the space. In addition, the high-pressure side region in the casing is covered with the thermal insulation member which is in contact with the outer surface of the casing. Therefore, a diffusion of heat in the high-pressure side region can be reduced by the thermal insulation member. In addition, a noise generated in the high-pressure side region can be absorbed and attenuated to a certain extent by the thermal insulation member. Accordingly, it is possible to positively reduce the noise in the low-pressure side region where the noise is easily generated by the soundproof cover while limiting the noise in the high-pressure side region by the thermal insulation member.

In the steam turbine according to a second aspect of the present disclosure, the soundproof cover may include at least one silencing porous plate in which a plurality of silencing holes are formed at intervals from each other.

According to the above configuration, a sound emitted from the outer surface of the casing is captured by the silencing holes of the silencing porous plates, and thereafter, is attenuated. Accordingly, it is possible to further reduce the noise.

In the steam turbine according to a third aspect of the present disclosure, the soundproof cover may include a plurality of the silencing porous plates which are arranged at intervals in a direction away from the outer surface of the casing, and when viewed in the direction away from the outer surface, positions of the silencing holes may be shifted from each other in a pair of the silencing porous plates adjacent to each other.

According to the above configuration, compared to a configuration in which only one silencing porous plate is provided, it is possible to further reduce the noise. Further, the positions of the silencing holes are shifted from each other between the pair of silencing porous plates adjacent to each other. Therefore, a sound wave which has passed through the silencing holes in one silencing porous plate is reflected by a region where the silencing holes of the other silencing porous plate are not formed. Moreover, an interference between other sound waves reaching the space through the one silencing porous plate and the reflected sound wave is generated in addition to the reflection in the space between the silencing porous plates. It is possible to further reduce the noise through the reflection and the interference.

In the steam turbine according to a fourth aspect of the present disclosure, the soundproof cover may further include a sound absorbing porous plate which is disposed at a position closer to the outer surface of the casing than the silencing porous plate and in which a plurality of sound absorbing holes are formed at intervals from each other, and a diameter dimension of each sound absorbing hole may be smaller than a diameter dimension of each silencing hole.

According to the above configuration, the sound absorbing porous plate is disposed closer to the outer surface of the casing than the silencing porous plate. The sound absorbing hole having the diameter dimension smaller than that of the silencing hole is formed in the sound absorbing porous plate. Accordingly, when viewed the sound absorbing porous plate, a Helmholtz resonator having the sound absorbing hole as an inlet is formed on the silencing porous plate side (that is, a side away from the outer surface of the casing). That is, air in a space closer to the silencing porous plate than the sound absorbing porous plate acts as a spring. Accordingly, a portion of the kinetic energy of the sound wave which has passed through the sound absorbing porous plate is converted into thermal energy. As a result, compared to a case where only the silencing porous plate is provided, it is possible to further reduce the noise.

In the steam turbine according to a fifth aspect of the present disclosure, the casing may be formed of different members in the low-pressure side region and the high-pressure side region, and the casing in the low-pressure side region may be formed to be thinner than the casing in the high-pressure side region.

According to the above configuration, the low-pressure side region in the casing is covered with the soundproof cover via a space with respect to the outer surface of the casing. Therefore, it is possible to reduce the noise regardless of the thickness of the casing in the low-pressure side region. As a result, it is possible to reduce the cost for building the steam turbine.

According to a sixth aspect of the present disclosure, there is provided a construction method of a steam turbine including: a step of preparing a turbine body which includes a rotor which is configured to rotate around an axis, and a casing which covers the rotor to form a flow path through which steam flows in an axial direction, together with the rotor, a thermal insulation member which is provided to be in contact with an outer surface of the casing in a high-pressure side region out of the high-pressure side region and a low-pressure side region in which pressure of the steam is different from each other of the casing in the axial direction, and a soundproof cover which covers the casing in the low-pressure side region out of the high-pressure side region and the low-pressure side region via a space between the outer surface of the casing and the soundproof cover; a thermal insulation member attachment step of attaching the thermal insulation member to the outer surface in the high-pressure side region of the casing; and a soundproof cover attachment step of attaching the soundproof cover with a space between the outer surface and the soundproof cover in the low-pressure side region of the casing.

According to the above method, the thermal insulation member and the soundproof cover are individually attached to the casing. Therefore, for example, compared to a case where the thermal insulation member and the soundproof cover are integrally formed and are attached at once, it is possible to improve workability. Thereby, it is possible to limit the cost concerning the building and construction of the steam turbine.

According to the present disclosure, it is possible to provide the steam turbine which is more compact and can further reduce the noise.

DETAILED DESCRIPTION OF THE INVENTION

Figure 1:
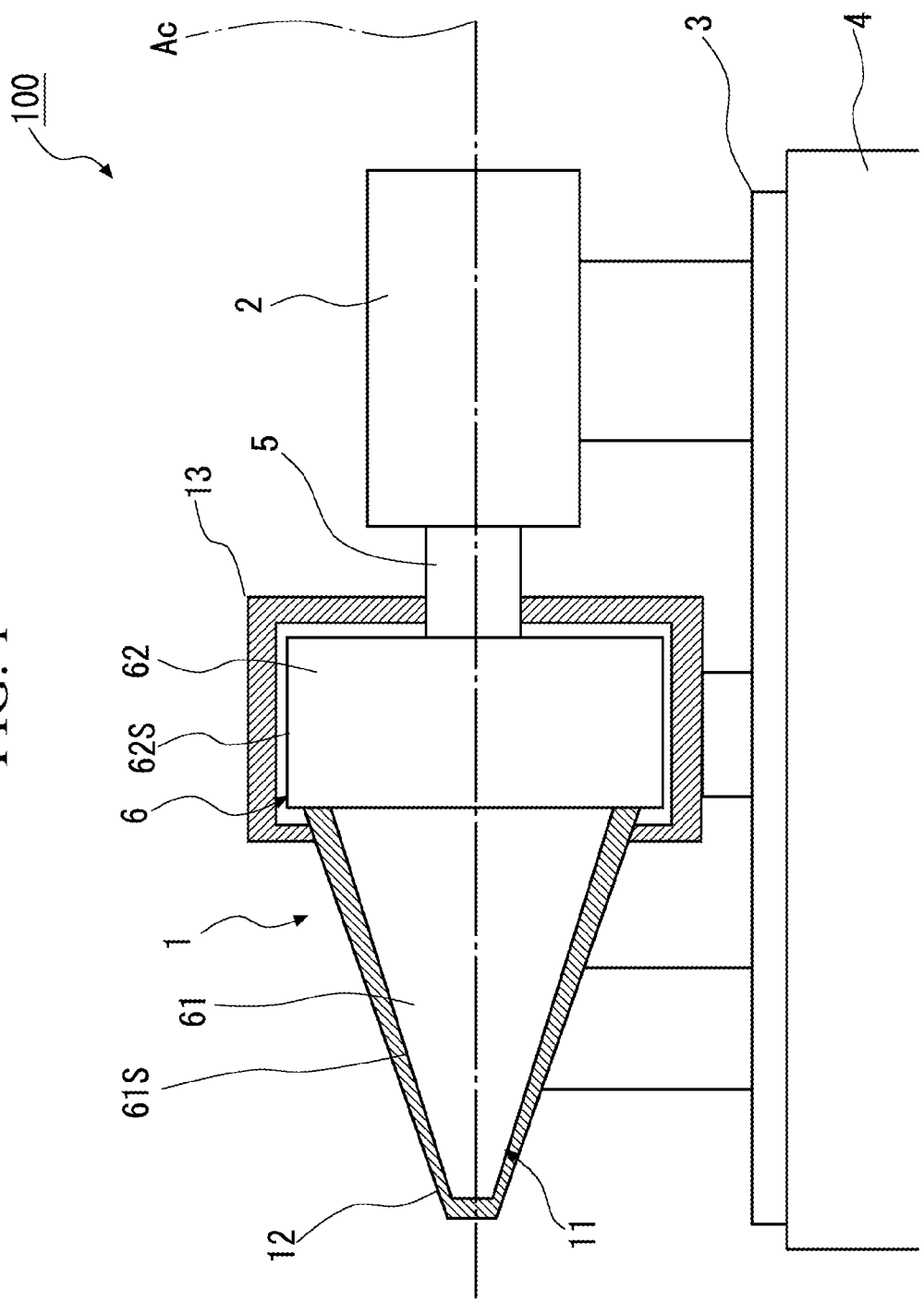
FIG. 1 is a schematic diagram showing a configuration of a steam turbine according to an embodiment of the present disclosure.

An embodiment of the present disclosure will be described with reference to FIGS. 1 to 4. A steam turbine system 100 according to the present embodiment includes a steam turbine 1, a generator 2, a base plate 3, and a foundation 4. The steam turbine 1 includes a turbine body 11, a thermal insulation member 12, and a soundproof cover 13. The turbine body 11 includes a rotor 5 which is configured to rotate around an axis Ac and a casing 6 which covers the rotor 5. Although not shown in detail, the rotor 5 has a columnar rotating shaft centered on the axis Ac and a plurality of rotor blades which are provided on an outer peripheral surface of the rotating shaft. The respective rotor blades are arranged on the outer peripheral surface of the rotating shaft along a circumferential direction.

The casing 6 has a cylindrical shape centered on the axis Ac. A space (flow path) is formed between an inner peripheral surface of the casing 6 and an outer peripheral surface of the rotor 5. Steam flows through this space from one side to the other side in an axis Ac direction in which the axis Ac extends. Further, a plurality of stationary blades which extend radially inward from the inner peripheral surface of the casing 6 and are arranged at intervals in the axis Ac direction are provided in this space. The respective stationary blades are alternately arranged with respect to the plurality of rotor blades in the axis Ac direction. High-temperature and high-pressure steam which has flowed into the flow path alternately collides with the plurality of rotor blades and the plurality of stationary blades. The steam collides with the rotor blades, and thus, a rotational force is applied to the rotor 5. The steam colliding with the stationary blade is guided and rectified toward the rotor blade on a downstream side. The generator 2 is coaxially connected to a shaft end of the rotor 5. The generator 2 is driven by the rotational force of the rotor 5 and generates electric power.

Although not shown in detail, the high-temperature and high-pressure steam supplied from a steam generation source such as a boiler flows from an intake port formed near one end portion (upstream side) of the casing 6 in the axis Ac direction to the flow path in the casing 6. The steam flowing through the flow path toward the other side (downstream side) in the axis Ac direction gradually decreases in pressure while sequentially colliding with the above-described rotor blades and stationary blades. That is, the steam is in a high pressure state in a region on one side in the axis Ac direction of the turbine body 11 while the steam is in a relatively low pressure state in a region on the other side in the axis Ac direction. In the following description, a portion on one side of the casing 6 in the axis Ac direction is referred to as a high-pressure side region 61, and a portion on the other side is referred to as a low-pressure side region 62. In the high-pressure side region 61 and the low-pressure side region 62, the casing 6 is separately formed by different members. A thickness of the casing 6 in the low-pressure side region 62 is thinner than a thickness of the casing 6 in the high-pressure side region 61.

In addition, the intake port (not shown) into which the steam flows is formed in the high-pressure side region 61 in the casing 6. An exhaust port (not shown) through which the steam inside the casing 6 is discharged to the outside is formed in the low-pressure side region 62 in the casing 6. The low-pressure side region 62 in the casing 6 covers the rotor blade and stationary blade of at least a final stage (most downstream side) among the rotor blades and the stationary blades of a plurality of stages. In the present embodiment, for example, the low-pressure side region 62 in the casing 6 covers the rotor blades and stationary blades of two stages of the last stage and one stage located at a first upstream side from the last stage.

For example, the high-pressure side region 61 in the casing 6 has a conical shape of which a radial dimension with respect to the axis Ac gradually increases from one side to the other side in the axis Ac direction. Meanwhile, the low-pressure side region 62 in the casing 6 has a bottomed cylindrical shape centered on the axis Ac. An outer diameter dimension of the casing 6 in the low-pressure side region 62 is constant over the entire area in the axis Ac direction. Moreover, the outer diameter dimension of the low-pressure side region 62 is larger than an outer diameter dimension of the other end portion (a portion having a largest outer dimension in the high-pressure side region 61) of the high-pressure side region 61 in the axis Ac direction.

A thermal insulation member 12 is provided on the outer surface (high-pressure side outer surface 61S) of the high-pressure side region 61 in the casing 6. The thermal insulation member 12 covers the high-pressure side region 61 in a state where the thermal insulation member 12 is in contact with the high-pressure side outer surface 61S without a gap from the outside. That is, an appearance of the thermal insulation member 12 follows a shape of the high-pressure side region 61 in the casing 6. As the thermal insulation member 12, specifically, it is desirable to use a material formed of inorganic fibers such as rock wool, glass wool, and ceramic fibers. In addition, in a case where the turbine body 11 is an object which is operated at a relatively low temperature, as the thermal insulation member 12, a material made of organic fibers such as polyamide fibers or polyester fibers typified by polyethylene terephthalate fibers may be used. Further, the thermal insulation member 12 may be a foamed material such as polyurethane in addition to the above-described fiber material. By providing the thermal insulation member 12, dissipation of thermal energy of the steam inside the high-pressure side region 61 is reduced, and a noise generated in the region is absorbed or attenuated to a certain extent. Therefore, preferably, the thermal insulation member 12 is a material having not only high heat insulation capacity but also high sound absorption performance, and is a highly flexible material so that a shape thereof can be changed along the high-pressure side outer surface 61S. Moreover, the thermal insulation member 12 covers only the high-pressure side region 61 in the casing 6. In other words, the thermal insulation member 12 is not provided in the low-pressure side region 62 in the casing 6.

The soundproof cover 13 is provided on an outer surface (low-pressure side outer surface 62S) of the low-pressure side region 62 in the casing 6. The soundproof cover 13 covers the low-pressure side region 62 with a space between the low-pressure side outer surface 62S and the soundproof cover 13. An appearance of the soundproof cover 13 has a box shape which covers the low-pressure side region 62 in the casing 6. Moreover, the soundproof cover 13 covers only the low-pressure side region 62 in the casing 6. In other words, the soundproof cover 13 is not provided in the high-pressure side region 61 in the casing 6. For example, the soundproof cover 13 has a vertically divided structure. A lower half portion of the soundproof cover 13 is fixed to the casing 6 and an upper half portion of the soundproof cover 13 can be attached to or detached from the lower half portion. Moreover, a detailed configuration of the soundproof cover 13 will be described later.

The steam turbine 1 and the generator 2 configured as described above are disposed on the foundation 4 via the base plate 3. The base plate 3 is disposed on an upper surface of the foundation 4 via an inclusion such as grout. The base plate 3 is leveled and flattened prior to the construction of the steam turbine 1 and the generator 2. For example, the foundation 4 is formed of reinforced concrete.

Figure 2:
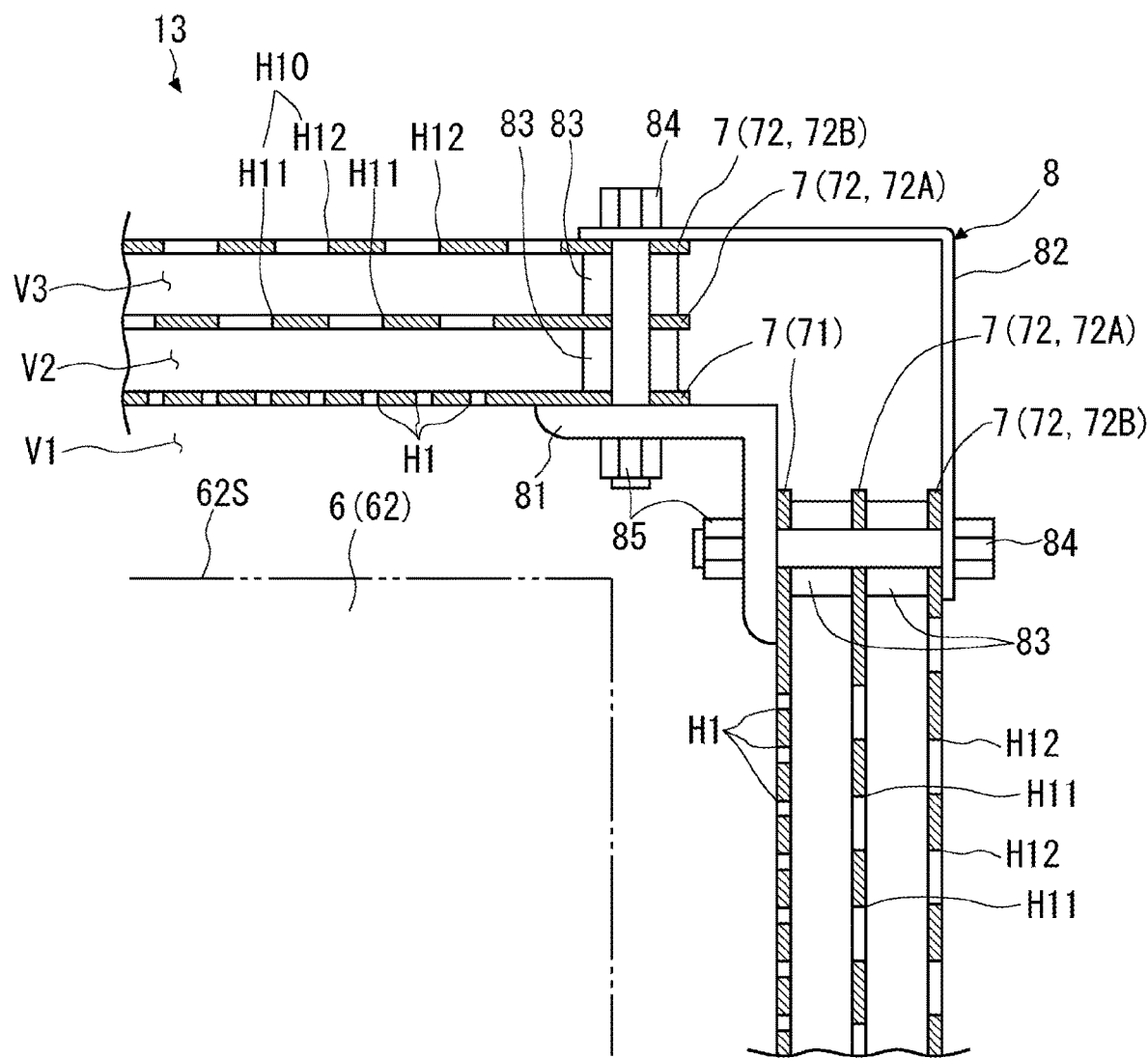
FIG. 2 is a cross-sectional view showing a configuration of a soundproof cover according to the embodiment of the present disclosure.

Next, the configuration of the soundproof cover 13 will be described in detail with reference to FIG. 2. As shown in FIG. 2, the soundproof cover 13 is disposed with a space (first space V1) with respect to the low-pressure side outer surface 62S. The soundproof cover 13 includes a plurality of (three in the present embodiment) porous plates 7 arranged at intervals in a direction away from the low-pressure side outer surface 62S, and a support member 8 which holds the porous plates 7 and is fixed to the low-pressure side region 62 of the casing 6 so as not to be relatively movable to the low-pressure side region 62.

The three porous plates 7 are arranged so as to be parallel to each other. In the three porous plates 7, the porous plate 7 closest to the low-pressure side outer surface 62S is a sound absorbing porous plate 71. A plurality of sound absorbing holes H1 are formed in the sound absorbing porous plate 71 at intervals (equal intervals). The sound absorbing holes H1 penetrate the sound absorbing porous plate 71. A diameter dimension of each sound absorbing hole H1 is smaller than a diameter dimension of a silencing hole H10 described later.

When viewed from the sound absorbing porous plate 71, two silencing porous plates 72 are disposed at an interval from each other on a side opposite to the low-pressure side outer surface 62S. Here, in the two silencing porous plates 72, the silencing porous plate 72 closer to the sound absorbing porous plate 71 is referred to as a first silencing porous plate 72A. Moreover, when viewed from the first silencing porous plates 72A, the silencing porous plate 72 located on a side opposite to the sound absorbing porous plate 71 is referred to as a second silencing porous plate 72B.

A space between the sound absorbing porous plate 71 and the first silencing porous plate 72A is a second space V2. A space between the first silencing porous plate 72A and the second silencing porous plate 72B is a third space V3. A plurality of the silencing holes H10 are formed at intervals (equal intervals) in each of the first silencing porous plate 72A and the second silencing porous plate 72B. The diameter dimension of each silencing hole H10 is set larger than the diameter dimension of each sound absorbing hole H1 formed in the above-described sound absorbing porous plate 71. Further, an interval (pitch) between the silencing holes H10 is set to be larger than an interval (pitch) between the sound absorbing holes H1. Here, each of the silencing holes H10 formed in the first silencing porous plate 72A is referred to as a first silencing hole H11. Moreover, each of the silencing holes H10 formed in the second silencing porous plate 72B is referred to as a second silencing hole H12.

Figure 3:
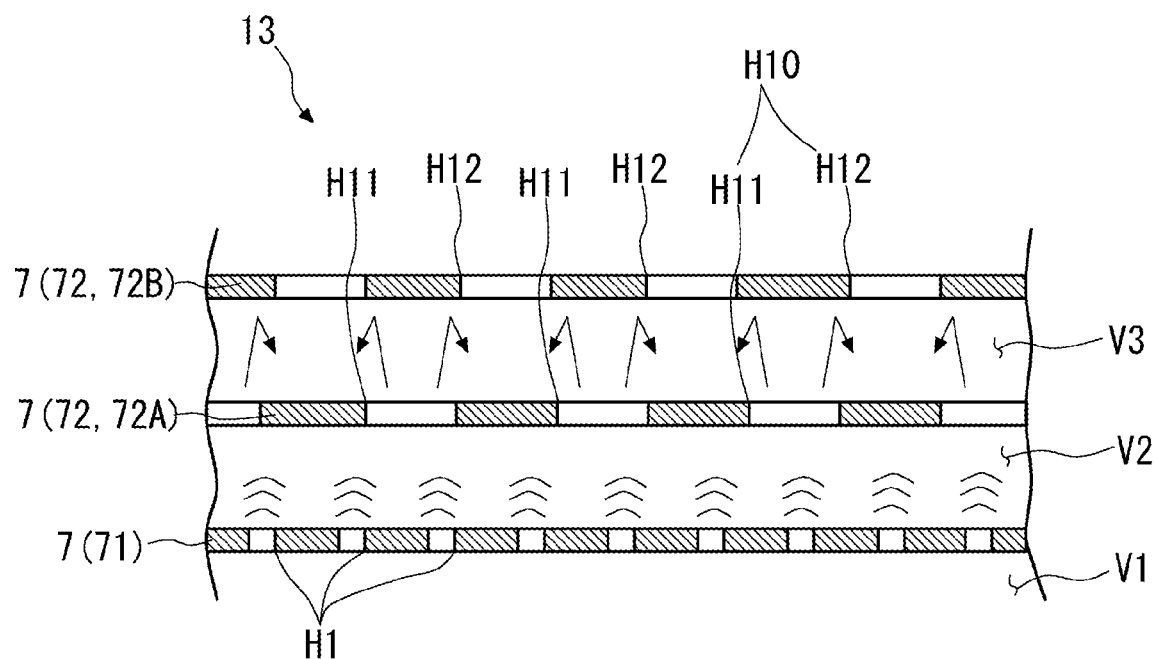
FIG. 3 is an explanatory diagram showing a positional relationship of holes in the soundproof cover according to the embodiment of the present disclosure.

Moreover as shown in FIG. 3, positions where the silencing holes H10 are formed are different from each other in the first silencing porous plate 72A and the second silencing porous plate 72B. More specifically, the first silencing holes H11 and the second silencing holes H12 are shifted so as not to overlap each other when viewed from the direction (that is, a normal direction of the low-pressure side outer surface 62S) away from the low-pressure side outer surface 62S. More precisely, the center positions of the first silencing hole H11 and the second silencing hole H12 are shifted from each other. The pitch of the adjacent first silencing holes H11 and the pitch of the adjacent second silencing holes H12 are the same as each other. As long as the center positions are shifted from each other, only a portion of the first silencing hole H11 and only a portion of the second silencing hole H12 may overlap each other. However, it is preferable that the first silencing hole H11 and the second silencing hole H12 do not completely overlap each other.

As shown in FIG. 2, the three porous plates 7 configured as described above are fixed to the casing 6 (low-pressure side outer surface 62S) by the support member 8. The support member 8 includes an inner angle portion 81 which abuts against the sound absorbing porous plate 71, an outer angle portion 82 that abuts against the second silencing porous plate 72B, two spacers 83 for securing spaces between the three porous plates 7, bolts 84, and nuts 85.

The inner angle portion 81 is disposed at a corner portion in the low-pressure side region 62 of the casing 6. The inner angle portion 81 has a substantially L shape so as to cover the corner portion from the outside. The inner angle portion 81 supports a pair of the sound absorbing porous plates 71 which spreads in directions which intersect (orthogonal) each other.

The outer angle portion 82 is disposed outside the inner angle portion 81. The outer angle portion 82 has a substantially L shape so as to cover the corner portion from the outside. The outer angle portion 82 supports a pair of the second silencing porous plates 72B which spreads in directions which intersect (orthogonal) each other.

Each spacer 83 is disposed between the sound absorbing porous plate 71 and the first silencing porous plate 72A, and between the first silencing porous plate 72A and the second silencing porous plate 72B. The bolt 84 is fastened to the nut 85 in a state of being inserted into through-holes which are formed in the inner angle portion 81, the sound absorbing porous plate 71, the first silencing porous plate 72A, the second silencing porous plate 72B, the two spacers 83, and the outer angle portion 82, respectively.

Accordingly, the sound absorbing porous plate 71, the first silencing porous plate 72A, and the second silencing porous plate 72B are held in a state of being interposed between the inner angle portion 81 and the outer angle portion 82. Moreover, although not shown in detail, the inner angle portion 81 which forms the lower half portion of the soundproof cover 13 is fixed to the low-pressure side region 62 in the casing 6.

Figure 4:
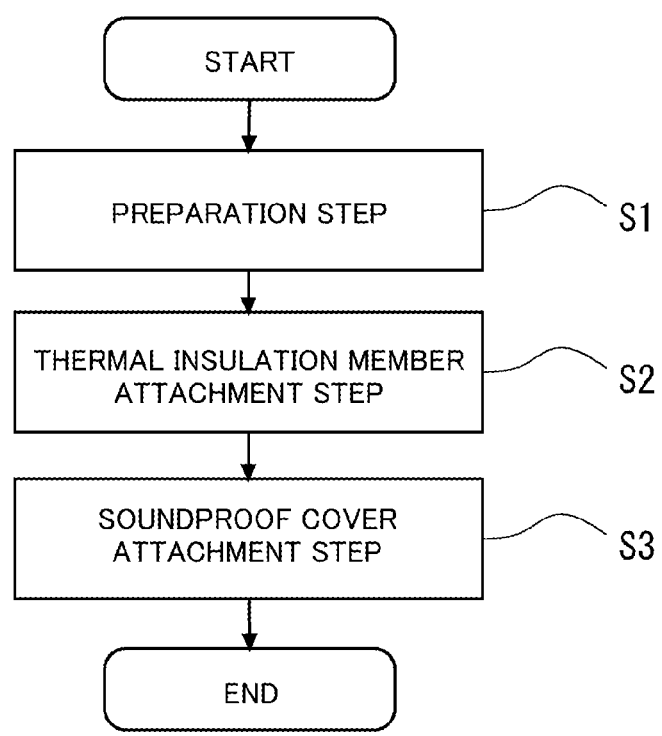
FIG. 4 is a process diagram showing a construction method of a steam turbine according to an embodiment of the present disclosure.

Next, a construction method of the steam turbine 1 according to this embodiment will be described with reference to FIG. 4. As shown in FIG. 4, the construction method includes a preparation step S1, a thermal insulation member attachment step S2, and a soundproof cover attachment step S3. In the preparation step S1, the above-described turbine body 11, thermal insulation member 12, and soundproof cover 13 are prepared. Specifically, the turbine body 11 is disposed on the foundation 4 via the base plate 3. Further, the thermal insulation member 12 is processed and molded in advance. The soundproof cover 13 is in a state where three porous plates 7 are assembled by the above-described support member 8. In the case, it is desirable that in the soundproof cover 13, the upper half portion covering the upper half side of the turbine body 11 and a lower half portion covering the lower half side thereof are separately prepared from each other.

Next, the thermal insulation member attachment step S2 is performed. In the thermal insulation member attachment step S2, the thermal insulation member 12 is attached to the high-pressure side region 61 in the casing 6. In this step, the thermal insulation member 12 is fixed to the high-pressure side outer surface 61S while being bent so as to come into contact with the high-pressure side outer surface 61S.

Next, the soundproof cover attachment step S3 is performed. In the soundproof cover attachment step S3, the soundproof cover 13 is attached to the low-pressure side region 62. In this step, the lower half portion of the soundproof cover 13 assembled in advance in the preparation step S1 is fixed to the low-pressure side region 62 in the casing 6. Thereafter, the upper half portion is fixed to the lower half portion of the soundproof cover 13. Accordingly, the low-pressure side region 62 is covered with the soundproof cover 13. As described above, all the steps of the construction method of the steam turbine 1 according to the present embodiment are completed.

Next, an operation of the steam turbine system 100 according to the present embodiment will be described. When the steam turbine system 100 is operated, first, high-temperature and high-pressure steam is led from an external steam supply source (such as a boiler) to a flow path inside the casing 6 via the intake port. The steam sequentially collides with the rotor blades and the stationary blades, and thus, applies the rotational force to the rotor 5. The rotational force of the rotor 5 is extracted from the shaft end, and rotationally drives the generator 2 connected coaxially with the rotor 5. Here, during the operation of the steam turbine 1, a noise is generated mainly due to a wind noise or the like when the steam flows through the rotor blades (stationary blades). Accordingly, it is necessary to reduce the noise so as to meet an environmental standard where the steam turbine 1 is installed, or the like. Meanwhile, in the steam turbine 1 according to the present embodiment, the above-described thermal insulation member 12 and soundproof cover 13 are attached to the turbine body 11.

Here, in the low-pressure side region 62, since a pressure of the steam flowing through the inside of the low-pressure side region 62 is low compared to the high-pressure side region 61, a thickness of the casing 6 is relatively small.

Thereby, in the low-pressure side region 62, the sound generated in the casing 6 is easily propagated to the outside compared to the high-pressure side region 61. However, according to the configuration, the low-pressure side region 62 in the casing 6 is covered with the soundproof cover 13 via the outer surface of the casing 6 and the space. Therefore, the noise generated in the low-pressure side region 62 can be absorbed and attenuated by the soundproof cover 13 while being attenuated by the space.

Moreover, in order to improve thermal efficiency of the steam turbine 1, it is desirable to limit a diffusion of heat through the casing 6 in the high-pressure side region 61 through which high-pressure steam flows. According to the above configuration, the high-pressure side region 61 in the casing 6 is covered with the thermal insulation member 12 which is in contact with the outer surface of the casing 6. Therefore, the diffusion of heat in the high-pressure side region 61 can be reduced by the thermal insulation member 12. In addition, the noise generated in the high-pressure side region 61 can be absorbed and attenuated to a certain extent by the thermal insulation member 12. Accordingly, it is possible to positively reduce the noise in the low-pressure side region 62 where the noise is easily generated by the soundproof cover 13 while limiting the noise in the high-pressure side region 61 by the thermal insulation member 12. Furthermore, for example, compared to a case where the entire steam turbine 1 is covered with a structure referred to as an outer garment, it is possible to reduce the size of the entire apparatus. Therefore, it is possible to provide the steam turbine 1 which is more compact and further reduces the noise.

Moreover, a sound emitted from the outer surface of the casing 6 is captured by the silencing holes H10 of the silencing porous plates 72, and thereafter, is attenuated. Accordingly, it is possible to further reduce the noise.

In addition, the plurality of silencing porous plates 72 are provided at intervals in the direction away from the outer surface of the casing 6. Therefore, compared to a configuration in which only one silencing porous plate 72 is provided, it is possible to further reduce the noise. Further, in the first silencing porous plate 72A and the second silencing porous plate 72B adjacent to each other, the positions of the silencing holes H10 are shifted from each other. Therefore, a sound wave which has passed through the first silencing holes H11 of the first silencing porous plate 72A is reflected by a region where the second silencing holes H12 of the second silencing porous plate 72B are not formed. Moreover, an interference between other sound waves reaching the third space V3 through the first silencing holes H11 and the reflected sound wave is generated in addition to the reflection in the third space V3 between the first silencing porous plate 72A and the second silencing porous plate 72B. It is possible to further reduce the noise through the reflection and the interference.

In addition, the sound absorbing porous plate 71 is disposed closer to the low-pressure side outer surface 62S than the first silencing porous plate 72A. The sound absorbing holes H1 having the diameter dimension smaller than those of the silencing holes H10 are formed in the sound absorbing porous plate 71. Therefore, before the sound emitted from the outer surface of the casing 6 reaches the first silencing porous plate 72A, the sound is captured by the silencing holes H10, and thereafter, is attenuated. Accordingly, it is possible to further reduce the noise.

Moreover, the sound absorbing porous plate 71 is provided. Accordingly, when viewed the sound absorbing porous plate 71, a Helmholtz resonator having the sound absorbing holes H1 as an inlet is formed on the silencing porous plate 72 side (that is, a side away from the low-pressure side outer surface 62S). That is, air in a space (second space V2, third space V3) closer to the silencing porous plate 72 than the sound absorbing porous plate 71 acts as a spring. Accordingly, a portion of the kinetic energy of the sound wave which has passed through the sound absorbing porous plate 71 is converted into thermal energy. As a result, compared to a case where only the silencing porous plate 72 is provided, it is possible to further reduce the noise.

Here, the pressure of the steam flowing through the low-pressure side region 62 is lower than that in the high-pressure side region 61. Accordingly, in general, the thickness of the casing 6 in the low-pressure side region 62 is relatively thinner than that of the high-pressure side region 61. As a result, in the low-pressure side region 62, the sound in the casing 6 is easily propagated to the outside compared to the high-pressure side region 61. The low-pressure side region 62 in the casing 6 is covered with the soundproof cover 13 via a space with respect to the low-pressure side outer surface 62S. Therefore, it is possible to reduce the noise regardless of the thickness of the casing 6 in the low-pressure side region 62. As a result, it is possible to reduce a cost for building the steam turbine 1.

Moreover, according to the above method, the thermal insulation member 12 and the soundproof cover 13 are individually attached to the casing 6. Therefore, for example, compared to a case where the thermal insulation member 12 and the soundproof cover 13 are integrally formed and are attached at once, it is possible to improve workability. Thereby, it is possible to limit the cost concerning the building and construction of the steam turbine 1.

Other Modification Examples of Embodiment

While preferred embodiments of the disclosure have been described and illustrated above, it should be understood that these are exemplary examples of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

EXPLANATION OF REFERENCES

1: steam turbine
2: generator
3: base plate
4: foundation
5: rotor
6: casing
7: porous plate
8: support member
11: turbine body
12: thermal insulation member
13: soundproof cover
61: high-pressure side region
61S: high-pressure side outer surface
62: low-pressure side region
62S: low-pressure side outer surface
71: sound absorbing porous plate
72: silencing porous plate
72A: first silencing porous plate
72B: second silencing porous plate
81: inner angle portion
82: outer angle portion
83: spacer
84: bolt
85: nut
100: steam turbine system Ac: axis
H1: sound absorbing hole
H11: first silencing hole
H12: second silencing hole
S1: preparation step
S2: thermal insulation member attachment step
S3: soundproof cover attachment step
V1: first space
V2: second space
V3: third space

What is claimed is:

1. A steam turbine comprising:
a turbine body which includes a rotor which is configured to rotate around an axis, and a casing which covers the rotor to form a flow path through which steam flows in an axial direction in which the axis extends, together with the rotor;
a thermal insulation member which is provided to be in contact with an outer surface of the casing in a high-pressure side region out of the high-pressure side region and a low-pressure side region in which pressure of the steam is different from each other of the casing in the axial direction; and
a soundproof cover which covers the casing in the low-pressure side region out of the high-pressure side region and the low-pressure side region via a space between the outer surface of the casing and the soundproof cover.

2. The steam turbine according to claim 1,
wherein the soundproof cover includes at least one silencing porous plate in which a plurality of silencing holes are formed at intervals from each other.

3. The steam turbine according to claim 2,
wherein the soundproof cover includes a plurality of the silencing porous plates which are arranged at intervals in a direction away from the outer surface of the casing, and
wherein when viewed in the direction away from the outer surface, positions of the silencing holes are shifted from each other in a pair of the silencing porous plates adjacent to each other.

4. The steam turbine according to claim 2,
wherein the soundproof cover further includes a sound absorbing porous plate which is disposed at a position closer to the outer surface of the casing than the silencing porous plate and in which a plurality of sound absorbing holes are formed at intervals from each other, and
wherein a diameter dimension of each sound absorbing hole is smaller than a diameter dimension of each silencing hole.

5. The steam turbine according to claim 1,
wherein the casing is formed of different members in the low-pressure side region and the high-pressure side region, and
wherein the casing in the low-pressure side region is formed to be thinner than the casing in the high-pressure side region.

6. The steam turbine according to claim 3,
wherein the soundproof cover further includes a sound absorbing porous plate which is disposed at a position closer to the outer surface of the casing than the silencing porous plate and in which a plurality of sound absorbing holes are formed at intervals from each other, and
wherein a diameter dimension of each sound absorbing hole is smaller than a diameter dimension of each silencing hole.

7. The steam turbine according to claim 2,
wherein the casing is formed of different members in the low-pressure side region and the high-pressure side region, and
wherein the casing in the low-pressure side region is formed to be thinner than the casing in the high-pressure side region.

8. The steam turbine according to claim 3,
wherein the casing is formed of different members in the low-pressure side region and the high-pressure side region, and
wherein the casing in the low-pressure side region is formed to be thinner than the casing in the high-pressure side region.

9. The steam turbine according to claim 4,
wherein the casing is formed of different members in the low-pressure side region and the high-pressure side region, and
wherein the casing in the low-pressure side region is formed to be thinner than the casing in the high-pressure side region.

10. The steam turbine according to claim 6,
wherein the casing is formed of different members in the low-pressure side region and the high-pressure side region, and
wherein the casing in the low-pressure side region is formed to be thinner than the casing in the high-pressure side region.

11. A construction method of a steam turbine comprising:
a step of preparing a turbine body which includes a rotor which is configured to rotate around an axis, and a casing which covers the rotor to form a flow path through which steam flows in an axial direction, together with the rotor, a thermal insulation member which is provided to be in contact with an outer surface of the casing in a high-pressure side region out of the high-pressure side region and a low-pressure side region in which pressure of the steam is different from each other of the casing in the axial direction, and a soundproof cover which covers the casing in the low-pressure side region out of the high-pressure side region and the low-pressure side region via a space between the outer surface of the casing and the soundproof cover;
a thermal insulation member attachment step of attaching the thermal insulation member to the outer surface in the high-pressure side region of the casing; and
a soundproof cover attachment step of attaching the soundproof cover with a space between the outer surface and the soundproof cover in the low-pressure side region of the casing.

* * * * *